Patented Aug. 15, 1950

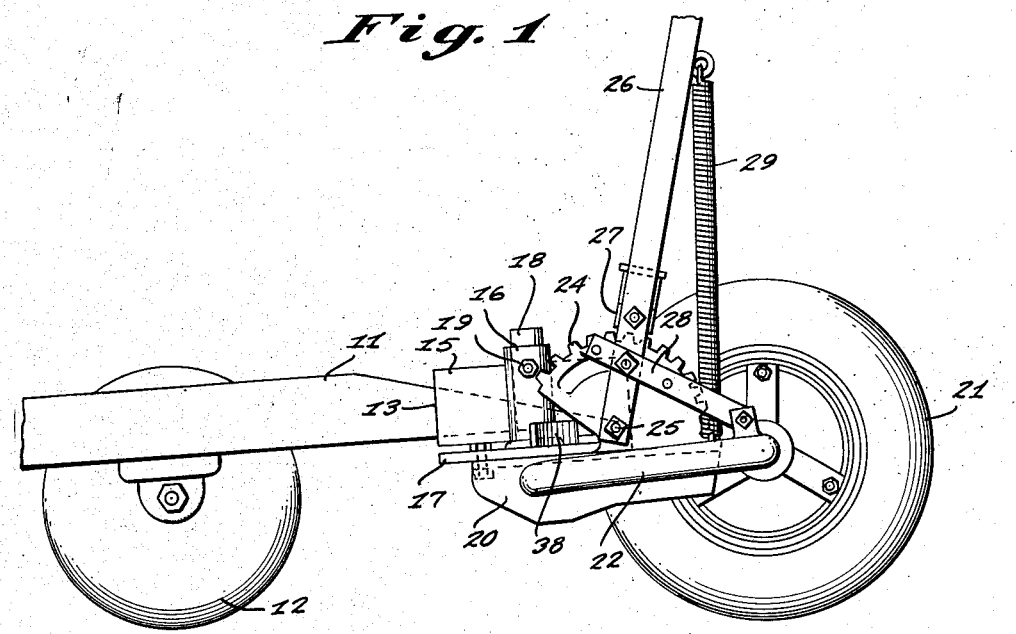
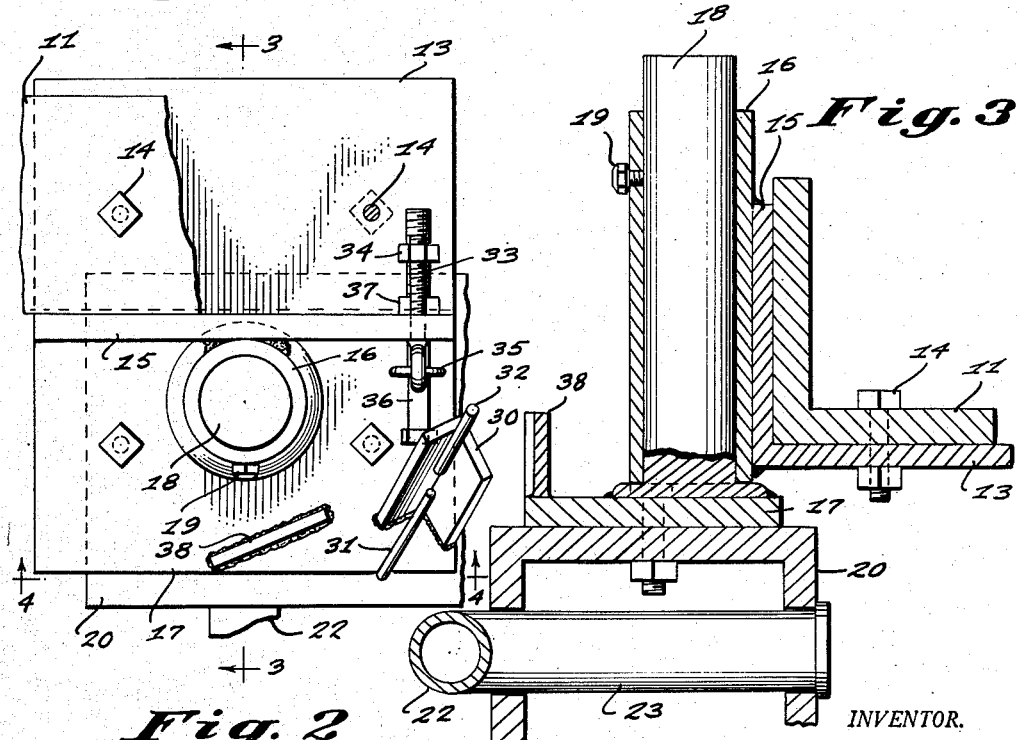

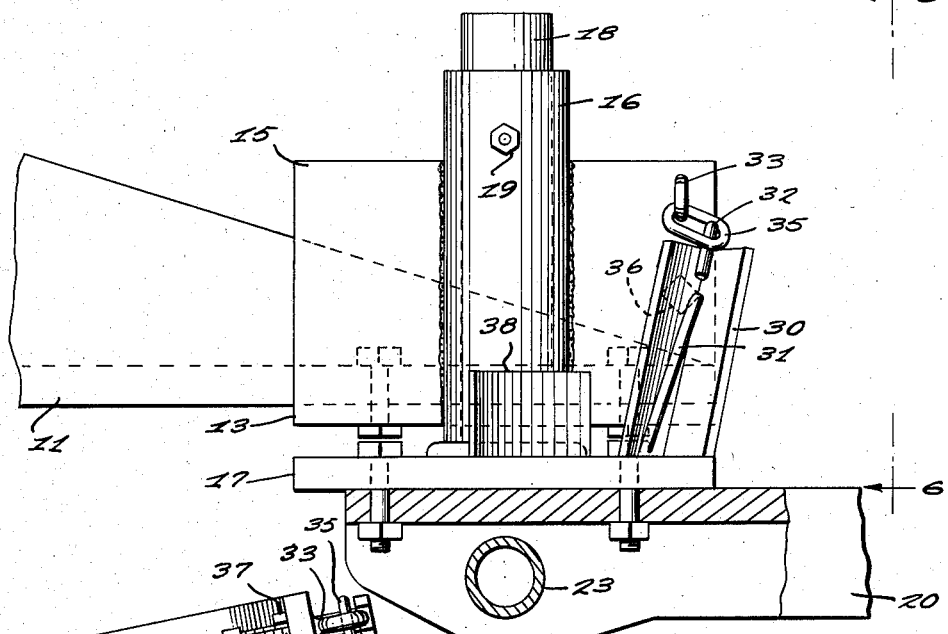
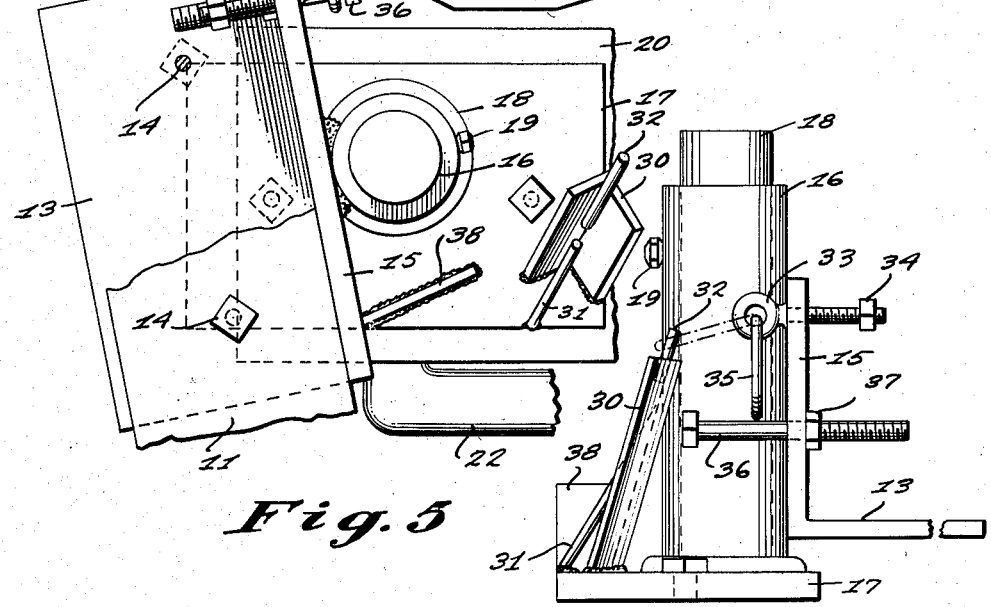

2,518,972

UNITED STATES PATENT OFFICE 2,518,972

SWIVEL CASTER BEARING FOR THE REAR WHEEL OF A DISK PLOW

Olin E. Allen, Turpin, Okla.

Application August 10, 1948, Serial No. 43,428

4 Claims. (Cl. 97—127)

This invention relates to plows, and more particularly to tractor-drawn disc plows.

A main object of the invention is to provide a novel and improved caster bearing of the swivel type for the rear wheel of a tractor-drawn disc plow, said bearing being very simple in construction, which facilitates the turning of the plow and which makes the plow much easier to guide and control than plows of the non-swiveling rear wheel type.

A further object of the invention is to provide an improved swivel caster bearing for the rear wheel of a disc plow which is inexpensive to fabricate, rugged in construction and which is adjustable to provide different plowing angles or for setting the plow at different angles, yet at the same time providing a substantial degree of free swinging movement of the rear wheel of the plow, whereby turning of the plow is greatly facilitated and the time required for the plowing operation is greatly reduced as compared with plows of the non-swivel rear wheel type.

Further objects and advantages of the invention will become apparent from the following description and claims, and from the accompanying drawings, wherein:

Figure 1 is a side elevational view of the rear portion of a disc plow provided with a swivel caster bearing for its rear wheel constructed in accordance with the present invention.

Figure 2 is an enlarged fragmentary top plan view of the swivel caster bearing structure shown in Figure 1.

Figure 3 is a cross-sectional detail view taken on line 3—3 of Figure 2.

Figure 4 is a cross-sectional detail view taken on line 4—4 of Figure 2.

Figure 5 is a top plan detail view similar to Figure 2 but showing the bearing swivelled to a limiting position.

Figure 6 is an elevational view of the bearing structure taken on line 6—6 of Figure 4.

Referring to the drawings, 11 designates the beam of the plow, said beam being disposed obliquely in the usual manner to the direction of travel of the plow. Beam 11 carries a plurality of spaced harrow discs 12 mounted thereon in a conventional manner. Beam 11 is L-shaped in cross-section as shown in Figure 3, and secured thereto in nesting relation is an angle bar 13, the horizontal flanges of the beam and said bar 13 being secured together by bolts 14. Designated at 15 is the vertical flange of angle bar 13, and welded to said vertical flange 15 is a vertical bearing sleeve 16. Designated at 17 is a horizontal plate member having welded thereto an upstanding stub shaft 18 which is rotatably positioned within the bearing sleeve 16, said sleeve being provided with a suitable lubricant fitting 19 for introducing lubricant into the sleeve. Plate member 17 is bolted to a channel member 20 underlying said plate member and extending rearwardly. The rear wheel 21 is journalled in a conventional manner to the rear end of a tubular arm 22 which has a right-angled bend 23 at its forward portion extending rotatably through the depending flanges of the channel member 20. The rear portion of channel member 20 is formed with a longitudinally extending vertical toothed sector 24 and pivoted thereto at 25 is an upwardly extending lever 26 provided with conventional releasable locking means 27, engageable with the teeth of the sector 24 for releasably locking said lever in an adjusted angular position relative thereto. The lever 26 is connected to the rear end of arm 22 by a link bar 28. Connecting the upper portion of lever 26 and the rear portion of arm 22 is a heavy spring 29 biasing arm 22 upwardly. It is therefore seen that by adjusting lever 26 in a clockwise direction, as viewed in Figure 1, the depth of plowing may be decreased, since the harrow discs 12 are elevated with respect to wheel 21 by such an adjustment. Conversely, by adjusting lever 26 in a counterclockwise direction, the depth of plowing will be increased.

Welded to plate member 17, adjacent its rear outer corner, is a rearwardly inclined upstanding angle bar 30 which is braced to the plate member by a rod member 31, welded at one end to the intermediate portion of bar 30 and at its other end to the outer margin of plate member 17. Also welded to the top portion of the angle bar 30 is an upstanding rod element 32 projecting above the top of the angle bar. Adjustably secured to the upper rear portion of flange 15 of the angle bar 13 is an eye bolt 33, said eye bolt being, for example, threaded through flange 15 and being lockable thereto by a locknut 34. The eye of said eye bolt carries a link 35 which may be engaged over the rod element 32, to secure the plate member 17 against rotation with respect to angle bar 13.

Threaded through flange 15 below eyebolt 33 is a stop screw 36, engageable by angle bar 30 to limit swivelling of plate member 17 in a clockwise direction with respect to angle bar 13, as viewed in Figure 2. Stop screw 36 is locked in adjusted position by a locknut 37 threaded thereon and abutting flange 15. Welded to plate member 17, at its outer marginal portion, is an upstanding laterally inclined stop plate 38, located laterally adjacent sleeve 16. Stop plate 38 is engageable by flange 15 in the manner shown in Figure 5 to limit counterclockwise swivelling of plate member 17 with respect to angle bar 13, as viewed in Figures 2 and 5.

During ordinary operation, when it is desired to allow the beam 11 to swivel with respect to rear wheel 21, for example, to facilitate turning the plow, the link 35 is left out of engagement with rod element 32. This allows the beam to swivel with respect to the rear wheel 21 between the limits defined by the position at which flange 15 engages stop plate 38 and the position at which the head of stop screw 36 engages the upstanding angle bar 30.

When it is desired to lock the rear wheel 21 against swivelling with respect to beam 11, the link 35 is engaged over the rod element 32, as above described.

While a specific embodiment of a swivel caster bearing for the rear wheel of a disc plow has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A rear wheel swivel caster for a disc plow comprising an angular bar member adapted to be secured to the rear end portion of the plow beam, a vertical bearing sleeve secured to said bar member, a plate member having an upstanding shaft element swivelly received in said sleeve, swivel limiting stop means on said plate member, an adjustable screw member carried by said angular bar member and being engageable with said stop means to limit rotation of said plate member with respect to said bar member, a rearwardly extending underlying channel member secured to said plate member, a rearwardly extending arm adjustably secured to said channel member, and a ground-engaging wheel journalled to the rear end of said arm.

2. A rear wheel swivel caster for a disc plow, comprising a bar member adapted to be secured to the rear end portion of the plow beam, a vertical bearing sleeve carried by said bar member, a plate member having an upstanding shaft element swivelly received in said sleeve, upstanding stop means on said plate member, an adjustable screw member carried by said bar member and being engageable with said stop means to limit rotation of said plate member with respect to said bar member, a rearwardly extending member secured to said plate member, and a ground-engaging wheel journalled to the rear end of said rearwardly extending member.

3. A rear wheel swivel caster for a disc plow, comprising a bar member adapted to be secured to the rear end portion of the plow beam, a vertical bearing sleeve carried by said bar member, a horizontal plate member having an upstanding shaft element swivelly received in said sleeve, an upstanding abutment member carried by the outer rear portion of said plate member, an eye member carried by said bar member laterally adjacent said abutment member, a link carried by said eye member, said link being at times engageable over said abutment member to secure the plate member against swivelling with respect to said bar member, a rearwardly extending member secured to said plate member, and a ground-engaging wheel journalled to the rear end of said rearwardly extending member.

4. A rear wheel swivel caster for a disc plow comprising a bar member adapted to be secured to the rear end portion of the plow beam, a vertical bearing sleeve carried by said bar member, a horizontal plate member having an upstanding shaft element swivelly received in said sleeve, a first upstanding abutment member carried by the outer intermediate portion of said plate member, a second upstanding abutment member carried by said plate member at its rear portion, a rod element projecting from the top of said second abutment member, an eye member carried by said bar member laterally adjacent said second abutment member, a link carried by said eye member, said link being at times engageable over said rod element to lock the plate member against swivelling with respect to said bar member, a rearwardly extending member secured to said plate member, and a ground-engaging wheel journalled to the rear end of said rearwardly extending member.

OLIN E. ALLEN.

REFERENCES CITED

The following references are of record in the file of this patent:

UNITED STATES PATENTS

| Number | Name | Date |
|---|---|---|
| 255,370 | Wiard | Mar. 21, 1882 |
| 520,645 | Jones | May 29, 1894 |
| 543,118 | Atkins et al. | July 23, 1895 |
| 625,764 | Heylman | May 30, 1899 |
| 814,552 | Marriage | Mar. 6, 1906 |